United States Patent [19]

Kovacs

[11] Patent Number: 4,817,657

[45] Date of Patent: Apr. 4, 1989

[54] INERTIALLY ACTIVATED SHUT-OFF VALVE

[76] Inventor: Mike Kovacs, 5648 Slicers Cir., Agoura Hills, Calif. 91301

[21] Appl. No.: 171,266

[22] Filed: Mar. 21, 1988

[51] Int. Cl.⁴ .............................................. F16K 17/36
[52] U.S. Cl. ........................................................ 137/38
[58] Field of Search ......................... 137/38, 39, 43, 45

[56] References Cited

U.S. PATENT DOCUMENTS

| | | | |
|---|---|---|---|
| 4,116,209 | 9/1978 | Greer | 137/38 |
| 4,207,912 | 6/1980 | Ichikawa | 137/39 |
| 4,640,303 | 2/1987 | Greenberg | 137/38 |

FOREIGN PATENT DOCUMENTS

| | | | |
|---|---|---|---|
| 48847 | 4/1977 | Japan | 137/38 |
| 163778 | 10/1982 | Japan | 137/38 |
| 13273 | 1/1983 | Japan | 137/38 |

Primary Examiner—Robert G. Nilson
Attorney, Agent, or Firm—Jack C. Munro

[57] ABSTRACT

An inertially operated valve for a fluid conduit which upon occuring a jarring force, such as an earthquake, the valve is moved to a shut-off position. The shut-off position occurs when a plug is caused to be jarred free from a holding position and then fall by gravity to block the flow of fluid through the valve. The holding of the plug in the retracted position, not blocking flow of fluid, is accomplished through the use of a magnet. A separate magnet is also utilized to hold the plug in the extended/blocking position. A resetting device is to be manually operated to move the plug from the extended/blocking position to the retracted position.

8 Claims, 1 Drawing Sheet

INERTIALLY ACTIVATED SHUT-OFF VALVE

BACKGROUND OF THE INVENTION

The field of this invention relates to valves for fluid conduits and more particularly to a valve which is to be automatically movable to a postion blocking the flow of fluid through a fluid conduit upon the valve incurring a jarring force of sufficient magnitude such as what would occur by an earthquake.

It is well-known that certain geographical areas are subject to frequent earthquakes. Within these areas are many residences and businesses. It is common that most of these residences and businesses are supplied with an inflammable gas which is utilized within the residences and businesses to operate a water heater, a stove, a clothes dryer or other similar type of appliance.

It is a common occurrence that, if the gas line incurs a sufficient force, rupture of the line will occur. The rupture of the line will result in flooding of the entire area with inflammable gas. Not only is this gas toxic to any individual that may be caused to breath such for an extended period of time, but most importantly it is easily combustible and almost always results in an explosion which produces a fire and results in destruction of the residence or place of business.

Previously, there have been many attempts of designing valves which are to be incorporated with a gas line to automatically shut the gas line off in the event of an earthquake. One common type of such a valve is what is shown within U.S. Pat. No. 4,535,796 which utilizes a severable link which is to break upon a sufficient force being encountered resulting in a valve plug being moved to a fluid flow blocking position. The inherent disadvantage of this type of device is that this valve is not easily resettable and actually requires replacement of the severable link in order for the valve to be moved to a resetting position. Another way such valves have been known to operate is through the use of a spring actuated latching mechanism which, when jarred, will disengage permitting the valve to move to a blocking position. Such resettable latch type mechanisms are shown by U.S. Pat. Nos. 4,103,697 and 4,513,763. A third type of an earthquake actuated shut-off valve utilizes a weight which, when jarred with sufficient force, is caused to move to a different position which then permits the valve to move to a closing position. Such an inertial weight activated valve is shown and described within U.S. Pat. Nos. 2,158,753 and 4,131,124.

Also, a common disadvantage of all of the aforementioned Patents is that they are complicated and, therefore, inherently expensive to manufacture and to sell to the consumer. Also, a disadvantage of such prior art mechanisms have been that they must remain in an activatable position for an extended period of time and not be affected by deterioration due to the extended period of non-usage. It is common that after such an extended period of inactivity that shut-off valves of the prior art do not function when needed. Also, a prior art device can be adjusted to shut-off upon incurring of an earthquake of a certain magnitude. However, after a period of time a substantially greater magnitude of earthquake is required in order to effect operation of the valve.

SUMMARY OF THE INVENTION

It is an object of the present invention to provide a seismic activatable inertial valve that is capable of operation at a preset level even after a long period of inactivity.

It is another object of the present invention to provide a valve which when activated is capable of being reset to an activatable position without requiring the use of any replacement of parts.

It is another object of the invention to provide an inertially activated shut-off valve that is responsive to a jarring force from any direction and has the same sensitivity to a force from any direction.

It is a further object of the present invention to provide an inertially activated shut-off valve that is sturdy in construction, composed of few parts and can be manufactured inexpensively.

It is a further object of the present invention to construct an inertially activate shut-off valve which when activated can be reset to an activatable position by even the most unskilled individual.

It is a further object of the present invention to construct an inertially activated shut-off valve which absolutely prevents any escape of gas during movement of the valve from the gas flow position to a gas non-flow position and vice-versa.

Although the valve of this invention has been found to be particularly useful in conjunction with gas, it is considered to be within the scope of this invention to use the valve with other types of fluids such as liquids.

The valve of the present invention utilizes a plug which is to be movable from a non-blocking (retracted) position to a fluid flow blocking (extended) position. Holding of the plug in the non-blocking position is accomplished through the use of a magnet. When the plug is moved to the blocking position, a tight fit of the plug with the conduit occurs which prevents any possibility of conducting of fluid through the fluid passage that is blocked. Upon the valve incurring a jarring force of sufficient magnitude, the plug is easily disengaged from the magnet and moved by gravity to the blocking position and held again by a magnet to tightly remain in the blocking position. When it is desired to reset the plug to the non-blocking position, there is utilized a manually movable pin which, when moved, quickly and easily moves the plug to that position.

DETAILED DESCRIPTION OF THE SHOWN EMBODIMENT

Figure 1:
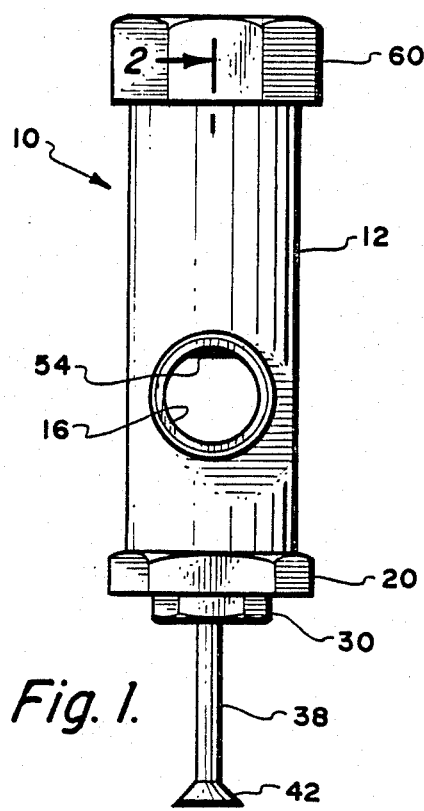
FIG. 1 is a side elevational view of the valve of the present invention.

Referring particularly to the drawings, there is shown the valve 10 of this invention. Valve 10 will normally be constructed of a rigid material with generally a metal being preferred. Valve 10 has a housing 12 which has an internal chamber 14. Also formed within the housing 12 is a fluid passage 16. Housing 12 also includes a valve seat 18. Valve seat 18 is of circular cross-section as is passage 16 and the internal chamber 14.

The lower end of the valve seat 18 is closed by means of a cap 20. Cap 20 is threadably secured within threaded opening 22 formed within the housing 12. This threaded opening 22 is located directly adjacent the seat 18.

Centrally located within the cap 20 is a hole 24. Hole 24 connects with an enlarged recess 26. A portion of the recess 26 is screw-threaded forming threads 28. Threadably secured with the threads 28 is an inner cap 30. Centrally located within the inner cap 30 is a hole 32.

The inner end of the hole 24 connects with enlarged cutout area 34. Located within the cutout area 34 is enlarged head 36 of a pin 38. Pin 38 is located within holes 24 and 32, which are in alignment, in a close conforming manner but is slideable in respect thereto. Within the enlarged recess 26 there will normally be located a seal 40 which forms a gas-tight connection between the cap 20 and the pin 38. The outer end of the pin 38 is formed into an enlarged headed flange 42. The function of the pin 38 will be explained further on in this specification.

The wall of the internal chamber 14 is conically shaped so that the lower end 44 is smaller in diameter than the upper end 46. In essence, the basic shape of the internal chamber 14 is that of a truncated cone. The lower end 44 connects directly with the fluid passage 16. It is to be understood that fluid, such as gas, is permitted to flow through the passage 16 in either direction. In other words, the housing 12 could be installed within a gas conduit and it is not required that the housing 12 be installed so that the gas will flow through the passage 16 in only one particular direction.

Located within the internal chamber 14 is a plug 48. This plug 48 will normally be of a rigid material with generally a metallic material being preferred. The basic shape of the plug 48 is also that of a truncated cone with the lower end 50 being of a smaller diameter than the upper end 52. Impregnated within the lower end of the plug 48 is a magnet 54. Impregnated within the upper end 52 is an extension 56. The extension 56 is to be constructed of a magnetized metallic material such as steel.

The extension 56 is to be attracted to and be held against a magnet 58. It is to be noted that the cross-sectional area of the extension 56 is less than the cross-sectional area of the magnet 58. The reason for this will become apparent further on in this description. The magnet 58 is fixedly mounted to the inside surface of a cap 60. The cap 60 includes a series of internal threads 62 which are to threadingly engage with the external threads 64 which are mounted on the exterior surface of the housing 12.

The operation of the valve 10 of this invention is as follows: Let it be assumed that the plug 48 is in the position shown in FIG. 2 which is what is termed the retracted position. The extension 56 is held by the magnet 58 and the plug 48 is located within the oversized internal chamber 14. Unrestricted flow of gas is permitted through the passage 16.

Figure 3:
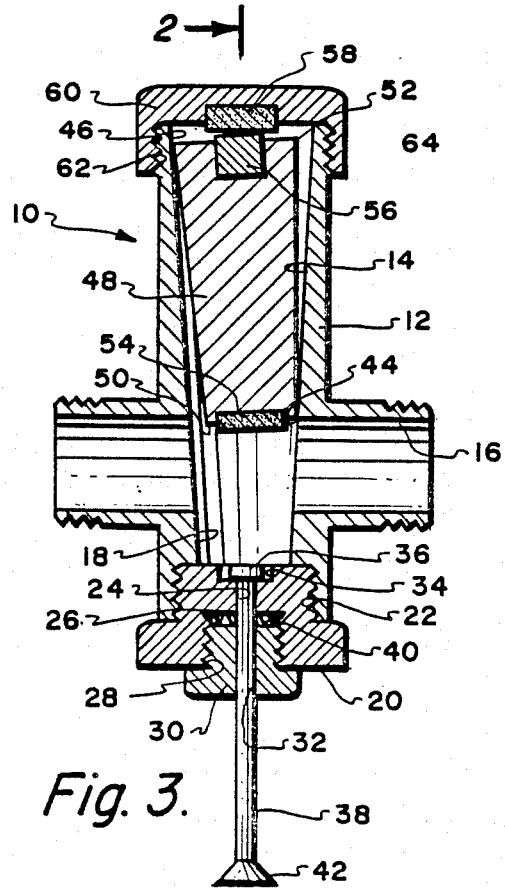
FIG. 3 is a cross-sectional view similar to FIG. 2 showing the valve in the position of having received a jarring force of sufficient magnitude to dislodge the valve plug.
Figure 4:
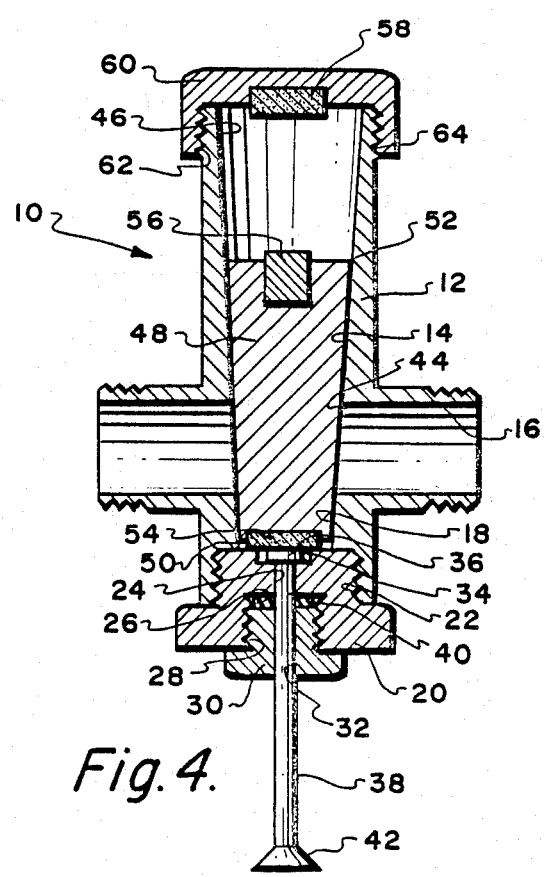
FIG. 4 is a view similar to FIG. 3 but with the valve plug in the extended position blocking the flow of fluid through the fluid passage.

Now let it be assumed that a jarring force, with sufficient magnitude, has been encountered by the valve 10. The plug 48 assumes a tilted configuration permitted due to the oversizing of the internal chamber 14 as is shown in FIG. 3. As a result a substantial diminishing of the magnetic holding force has occurred between the magnet 58 and the extension 56. The weight of the plug 48 is now sufficient to overcome the magnetic holding force and the plug 48 will fall by gravity across the fluid passage 16, as shown in FIG. 4, with magnet 54 coming into contact with the inner surface of the cap 20 covering enlarged head 36 and recess 34. At this particular position, gas is not capable of being conducted through the passage 16. The plug 48 closely conforms to the lower section of the internal chamber 14 with the lower end of the plug 48 also closely conforming with the seat 18. Gas leakage across the plug 48 through the passage 16 is thereby prevented.

Figure 2:
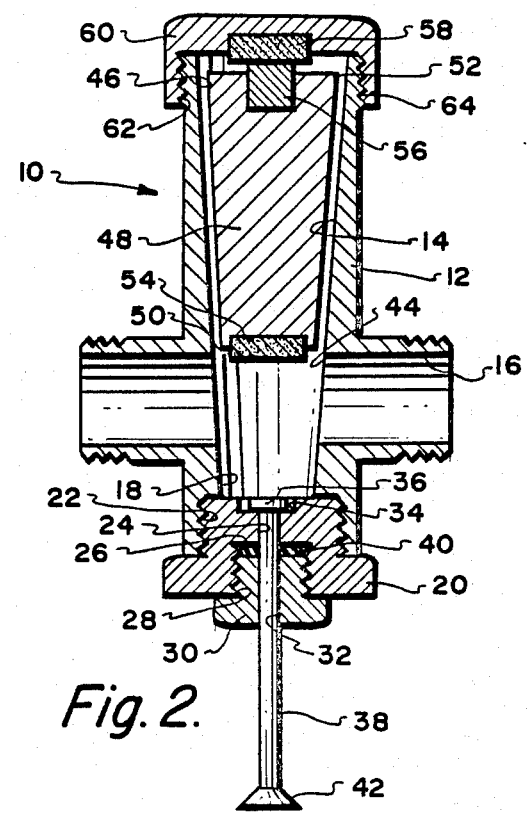
FIG. 2 is a cross-sectional view taken along line 2—2 of FIG. 1 showing the valve in the retracted position.

When it is desired to reset the valve 10 and again permit the flow of gas through the passage 16, it is only necessary for the user to apply a manual force against the enlarged headed flange 42 and move head 36 of pin 38 against the magnet 54 which moves plug 48 until extension 56 is again located against the magnet 58. The magnetic force of magnet 58 is substantially greater than the magnet force of magnet 54. The user is to grasp the pin 38 and move such away from the magnet 54 to the lower position as shown in FIGS. 2 to 4. The fact that the magnetic force of magnet 56 is greater than magnet 54 will permit this separation to occur leaving the plug 48 in its now established retracted position. At this particular time, gas is permitted to flow freely through the fluid passage 16.

What is claimed is:

1. A valve for preventing flow of a fluid within a conduit comprising:

a housing, said housing including a fluid passage, said housing including an internal chamber, said internal chamber having an upper end and a lower end, said lower end connecting with said fluid passage, said upper end being spaced from said fluid passage;

a plug mounted within said internal chamber, said plug being movable between a retracted position and an extended position, said retracted position being when said plug is located totally within said internal chamber and unrestricts flow through said fluid passage, said extended position being when said plug is located within said fluid passage blocking flow of fluid therethrough;

first magnet means connecting said plug and said housing, said first magnet means to support said plug in said retracted position, upon said housing incurring a jarring force of sufficient magnitude said plug is caused to disengage from said first magnet means with said plug to then move by gravity to said extended position, said first magnet means located at said upper end of said internal chamber; and said plug including an extension, said extension to connect with said first magnet means, said extension being of a lesser cross-sectional area than said first magnet means.

2. The valve as defined in claim 1 wherein:
said first magnet means comprising a disc mounted within said upper end of said housing.

3. The valve as defined in claim 2 wherein:
said internal chamber having a side wall being basically in the shape of a truncated cone, said lower end being of a lesser diameter than said upper end.

4. The valve as defined in claim 3 wherein:
said plug assuming a truncated cone configuration.

5. The valve as defined in claim 4 wherein:
with said plug in said retracted position said internal chamber being oversized relative to said plug, with said plug in said extended position said plug snugly engaging with the wall surface of said internal chamber.

6. The valve as defined in claim 2 including:
second magnet means for holding said plug in said extended position.

7. The valve as defined in claim 2 including:
resetting means connected with said housing, said resetting means to be usable to affect movement of said plug from said extended position to said retracted position.

8. The valve as defined in claim 7 wherein:
said resetting means comprising a pin which is to be manually moved to cause movement of said plug from said extended position to said retracted position.

* * * * *